United States Patent Office 2,836,538
Patented May 27, 1958

2,836,538

ALKYLSULFONYL AND ARYLSULFONYL DERIVATIVES OF METHYLENEDIOXYANILINE

Edward A. Prill, Yonkers, N. Y., assignor to Boyce Thompson Institute for Plant Research, Inc., a corporation of New York No Drawing. Application November 29, 1954
Serial No. 471,880

7 Claims. (Cl. 167—33)

This invention relates to organic compounds, their preparation, and their use as insecticides, particularly as synergists for pyrethrins and analogous insecticides, such as allethrin, and as intermediates for making such synergists.

The invention provides compounds represented by the formula

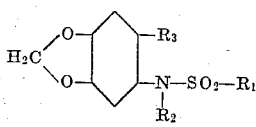

wherein $R_1$ is a hydrocarbon radical, $R_2$ is a member of the group consisting of a hydrogen atom and hydrocarbon radicals attached through a saturated non-tertiary carbon atom, and $R_3$ is a member of the group consisting of a hydrogen atom, the allyl radical and alkyl radicals.

In the preparation of the compounds of the above formula, wherein $R_2$ is hydrogen, the process of the invention includes the use of an aniline derivative of the formula,

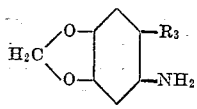

wherein $R_3$ is as above, and an organic sulfonyl chloride of the formula $R_1$—$SO_2$—Cl, wherein $R_1$ is as above.

A preferred aniline derivative is 6-aminodihydrosafrole ($R_3$ is n-propyl). Other aniline derivatives which may be used are 3,4-methylenedioxyaniline ($R_3$ is hydrogen), 2-methyl-3,4-methylenedioxyaniline ($R_3$ is methyl), 2-isopropyl-3,4-methylenedioxyaniline ($R_3$ is isopropyl), 2-tert. butyl-3,4-methylenedioxyaniline ($R_3$ is tert. butyl), and 6-aminosafrole ($R_3$ is allyl).

The organic sulfonyl chloride may be any alkanesulfonyl chloride, such as, for example, Methanesulfonyl chloride ($R_1$ is methyl)
Ethanesulfonyl chloride ($R_1$ is ethyl)
Pentanesulfonyl chloride ($R_1$ is amyl)
Heptanesulfonyl chloride ($R_1$ is n-heptyl)
Octanesulfonyl chloride ($R_1$ is n-octyl)
Iso-octanesulfonyl chloride ($R_1$ is iso-octyl)
2-ethylhexanesulfonyl chloride ($R_1$ is 2-ethylhexyl)
Decanesulfonyl chloride ($R_1$ is n-decyl)

and the like; also, there may be used an aromatic sulfonyl chloride, such as, for example, Benzenesulfonyl chloride ($R_1$ is phenyl)
p-Toluenesulfonyl chloride ($R_1$ is p-tolyl)
Cumenesulfonyl chloride ($R_1$ is p-isopropylphenyl)

and the like; also there may be used 1-propene-3-sulfonyl chloride ($R_1$ is allyl)
1-propene-2-methyl-3-sulfonyl chloride ($R_1$ is 2-methylallyl)
α-Toluenesulfonyl chloride ($R_1$ is benzyl)

and the like.

Equimolecular quantities of the said aniline derivative and the said organic sulfonyl chloride are caused to react together with the elimination of hydrogen chloride in an inert solvent preferably in a non-oxidizing atmosphere (to avoid autoxidation of the aniline derivative) in the presence of a hydrogen chloride acceptor to produce the compound of the invention of the above general formula wherein $R_3$ and $R_1$ have the indicated values and $R_2$ is hydrogen. The hydrogen chloride acceptor may be an aqueous solution of an alkaline substance, such as, sodium hydroxide, sodium carbonate and the like, or it may be a second molecule of the aniline derivative, or it may be an aliphatic tertiary amine.

The following specific example illustrates the preparation of a compound of the invention in which $R_1$ is n-octyl, $R_2$ is hydrogen and $R_3$ is n-propyl. A flask was fitted with a dropping funnel and a gas inlet and outlet, and the air was displaced from the flask by passing in a slow continuous stream of illuminating gas. There was introduced 25 g. of freshly distilled 6-aminodihydrosafrole dissolved in 100 ml. of benzene, followed by 15 g. of triethylamine. To the mixture was slowly added with agitation 32 g. of n-octane-sulfonyl chloride. Some triethylamine hydrochloride separated out of the solution. After standing at room temperature over night the benzene solution was washed with dilute hydrochloric acid and then with dilute aqueous sodium carbonate solution. The benzene was evaporated off from the solution and the residue taken up in isopropyl alcohol. The isopropyl alcohol solution was decolorized with activated carbon, then concentrated, and set in a cold room after which the desired compound crystallized in fine white needle-like crystals having a melting point of about 69° C. A solution containing 0.4 g. of this compound plus 0.05 g. of pyrethrins per 100 ml. of solvent consisting of petroleum distillate containing 5% acetone gave a kill of 90% when tested against house flies by the Peet-Grady method, whereas the official test insecticide (O. T. I.) (which contains 0.1 g. of pyrethrins per 100 ml.) gave a kill of only 53%.

The compounds of the invention of the above general formula wherein $R_2$ is hydrogen can be converted into other compounds of the invention of the general formula, wherein $R_2$ is a hydrocarbon radical attached through a saturated, non-tertiary carbon atom, with the advantage that the new compounds are more soluble in petroleum distillates or require a lesser quantity of more polar co-solvent for solution in petroleum distillates. To effect this conversion the said compound of the invention of the general formula wherein $R_2$ is a hydrogen atom is treated with a reagent capable of replacing the said hydrogen atom by an alkali metal atom, such as a sodium alkoxide, and then with an alkylating agent having a formula such as $R_2X$ and $(R_2)_2SO_4$, wherein $R_2$ is a hydrocarbon radical attached through a saturated, non-tertiary carbon atom and X is a halogen atom, whereby the original said hydrogen atom is replaced by the said hydrocarbon radical. Any of the above indicated compounds of the invention, in the general formula of which $R_2$ is a hydrogen atom may be thus transformed into other compounds of the invention, in the general formula of which $R_2$ is a hydrocarbon radical attached through a saturated, non-tertiary carbon atom. Some of the alkylating agents useful for the replacement of the hydrogen atom by a hydrocarbon radical of the specified type, and the value of $R_2$ for the radical so introduced into a compound of the invention, are as follows:

Dimethyl sulfate ($R_2$ is methyl)
Diethyl sulfate ($R_2$ is ethyl)
n-Butyl iodide ($R_2$ is n-butyl)
n-Hexyl iodide ($R_2$ is n-hexyl)

n-Octyl iodide ($R_2$ is n-octyl)
n-Decyl iodide ($R_2$ is n-decyl)
Benzyl chloride ($R_2$ is benzyl)
Allyl bromide ($R_2$ is allyl)
2-methylallyl chloride ($R_2$ is 2-methylallyl)
Propargyl bromide ($R_2$ is propargyl)
and the like.

The following specific example illustrates the preparation of a compound of the invention in the formula for which $R_2$ is a hydrocarbon radical. One g. of metallic sodium was dissolved in 50 ml. of absolute isopropyl alcohol to form sodium isopropoxide solution. To this was added 6 g. of the previously described compound of the invention in the formula for which $R_1$ is n-octyl, $R_2$ is hydrogen, and $R_3$ is n-propyl. After mixing, 5 ml. of diethyl sulfate were added and the mixture refluxed for several hours. The mixture was then subjected to steam-distillation to remove volatile impurities and the oily residue then taken up in petroleum ether (B. P. 30–60°) in which it is very soluble. (The unethylated intermediary compound used is not appreciably soluble in petroleum ether.) On evaporation of the petroleum ether the compound of the invention having the formula in which $R_1$ is n-octyl, $R_2$ is ethyl and $R_3$ is n-propyl was obtained as a viscous oil. A solution containing 0.27 g. of this compound plus 0.05 g. of pyrethrins per 100 ml. of petroleum distillate gave a kill of 91% when tested against house flies by the Peet-Grady method, whereas the O. T. I. (which contains 0.1 g. pyrethrins per 100 ml.) gave a kill of only 40%. A solution of 0.2 g. of this compound and 0.05 g. allethrin per 100 ml. of petroleum distillate gave a kill of 45% when tested by the Peet-Grady method whereas the O. T. I. gave a kill of only 24%.

The insecticidal activity of the compounds has been demonstrated with solutions in petroleum distillates but other formulations such as water emulsions, solutions in liquified gases such as dichlorodifluoromethane for use as aerosols, and impregnated dusts also may be used.

I claim:

1. The compounds represented by the formula

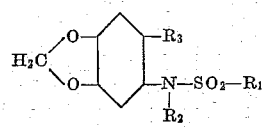

wherein $R_1$ is a hydrocarbon radical containing from 1–10 carbon atoms, $R_2$ is a member of the group consisting of the hydrogen atom and alkyl, alkenyl, and aralkyl radicals containing not more than 10 carbon atoms attached through a saturated non-tertiary carbon atom, and $R_3$ is a member of the group consisting of the hydrogen atom and acyclic hydrocarbon radicals containing not more than 4 carbon atoms.

2. The compounds represented by the formula according to claim 1, wherein $R_2$ is a hydrogen atom.

3. The compound represented by the formula

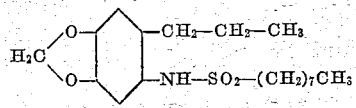

4. The compound represented by the formula

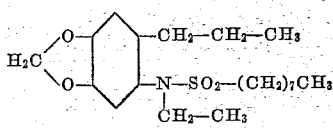

5. An insecticidal composition comprising a compound of claim 1 and an insecticide of the pyrethrins type together with an inert carrier capable of solvating said composition.

6. An insecticidal composition comprising a compound of claim 2 and an insecticide of the pyrethrins type together with an inert carrier capable of solvating said composition.

7. An insecticidal composition comprising a compound of claim 3 and an insecticide of the pyrethrins type together with an inert carrier capable of solvating said composition.

References Cited in the file of this patent

UNITED STATES PATENTS

| | | |
|---|---|---|
| 2,485,600 | Hedenburg | Oct. 25, 1949 |
| 2,485,680 | Wachs | Oct. 25, 1949 |
| 2,486,445 | Synerholm | Nov. 1, 1949 |
| 2,486,579 | Synerholm | Nov. 1, 1949 |

OTHER REFERENCES

Marvel et al.: J. A. C. S., vol. 51 (1929), pp. 1272–1273.

Hickinbottom: Reactions of Organic Compounds (1948), Longmans, Green and Co., New York, pp. 299–303.